(12) United States Patent
Zhang et al.

(10) Patent No.: US 11,831,050 B2
(45) Date of Patent: Nov. 28, 2023

(54) METHOD AND APPARATUS FOR SUBZERO START-UP OF FUEL CELL

(71) Applicant: TSINGHUA UNIVERSITY, Beijing (CN)

(72) Inventors: Jianbo Zhang, Beijing (CN); Dechun Si, Beijing (CN); Junning Wen, Beijing (CN); Kei Ono, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 278 days.

(21) Appl. No.: 17/319,105

(22) Filed: May 13, 2021

(65) Prior Publication Data
US 2021/0265644 A1    Aug. 26, 2021

Related U.S. Application Data

(63) Continuation of application No. PCT/CN2018/116636, filed on Nov. 21, 2018.

(30) Foreign Application Priority Data

Nov. 13, 2018  (CN) .......................... 201811347849.0

(51) Int. Cl.
*H01M 8/04223*    (2016.01)
*H01M 8/04225*    (2016.01)
(Continued)

(52) U.S. Cl.
CPC ... *H01M 8/04253* (2013.01); *H01M 8/04225* (2016.02); *H01M 8/04268* (2013.01);
(Continued)

(58) Field of Classification Search
CPC ......... H01M 8/04253; H01M 8/04225; H01M 8/04268; H01M 8/04365; H01M 8/04231; H01M 8/04649; H01M 8/0488; H01M 8/0491; H01M 8/04952; H01M 8/04007; H01M 8/04014; H01M 8/04052; H01M 8/04201; H01M 8/04302; H01M 8/04328; H01M 8/04335; H01M 8/04343;
(Continued)

(56) References Cited

U.S. PATENT DOCUMENTS 6,727,012 B2   4/2004   Chen et al.
2003/0091877 A1   5/2003   Chen et al.
2016/0141666 A1   5/2016   Shim et al.

FOREIGN PATENT DOCUMENTS

CN    101170187    *   4/2008
CN    101170187  A       4/2008
(Continued)

*Primary Examiner* — Matthew W Van Oudenaren (57) ABSTRACT

Disclosed are a method and apparatus for subzero start-up of a fuel cell. The method for the subzero start-up of the fuel cell includes: introducing a gas containing hydrogen having a mass percentage of 5% to 100% to a hydrogen electrode and an air electrode of the fuel cell (2) under a condition of minus 50° C. to 0° C.; applying a current or a voltage to the fuel cell (2), and utilizing ohmic heat generation, reaction heat, and concentration overpotential heat generation of the fuel cell (2) to raise the fuel cell (2) to a required temperature or to cause the fuel cell (2) to reach to a set time, so as to implement the subzero start-up of the fuel cell.

18 Claims, 3 Drawing Sheets

(51) Int. Cl.
*H01M 8/04858* (2016.01)
*H01M 8/0432* (2016.01)
*H01M 8/04537* (2016.01)
*H01M 8/10* (2016.01)

(52) U.S. Cl.
CPC ........ *H01M 8/0488* (2013.01); *H01M 8/0491* (2013.01); *H01M 8/04231* (2013.01); *H01M 8/04365* (2013.01); *H01M 8/04649* (2013.01); *H01M 8/04952* (2016.02); *H01M 2008/1095* (2013.01); *H01M 2250/20* (2013.01)

(58) Field of Classification Search
CPC ........... H01M 8/0435; H01M 8/04544; H01M 8/04574; H01M 8/04567; H01M 8/04597; H01M 8/04701; H01M 8/04708; H01M 8/04716; H01M 8/04865; H01M 8/04888; H01M 8/04895; H01M 8/04917; H01M 8/086; H01M 8/04641; H01M 2250/20; H01M 2008/1095

See application file for complete search history.

(56) References Cited

FOREIGN PATENT DOCUMENTS

| | | |
|---|---|---|
| CN | 100527510 C | 8/2009 |
| CN | 103825037 A | 5/2014 |
| CN | 203800126 U | 8/2014 |
| CN | 105702979 A | 6/2016 |
| CN | 207426027 U | 5/2018 |
| CN | 105702979 B | 6/2018 |
| CN | 108400367 A | 8/2018 |
| CN | 208111580 U | 11/2018 |
| WO | 03041187 A2 | 5/2003 |
| WO | 2003041187 A3 | 5/2003 |

* cited by examiner

METHOD AND APPARATUS FOR SUBZERO START-UP OF FUEL CELL

CROSS-REFERENCE TO RELATED APPLICATION

The present application is a continuation of International Application No. PCT/CN2018/116636, filed on Nov. 21, 2018, which claims priority to Chinese patent application No. 201811347849.0, filed on Nov. 13, 2018, both of which are hereby incorporated by reference in their entireties.

TECHNICAL FIELD

The present disclosure relates to the field of fuel cell technologies, and more particularly, to a method and apparatus for subzero start-up of a fuel cell.

BACKGROUND

A fuel cell may convert chemical energy of a fuel and an oxidant into electric energy, and energy conversion efficiency of the fuel cell is not restricted by theoretical efficiency of the Carnot heat engine cycle. The fuel cell, which has advantages such as high efficiency, environmental friendliness, quietness, and high reliability, has broad development prospects in many fields. With a high power density, fast start-up, and quick response to load changes, a proton exchange membrane fuel cell has become an important development direction for energy in the transportation field. The proton exchange membrane fuel cell as vehicle power withstands tests of high potential, high current, frequency-varying load, subzero start-up, air impurities and other complex working conditions and harsh environments. A capability of subzero start-up is the biggest challenge that fuel cell vehicles face in winter, and it is also one of the main obstacles to the promotion of the fuel cell vehicles in the temperate zone and the frigid zone.

Regarding the problem of the subzero start-up of the fuel cell, the academic community and the industry have carried out a lot of research work, and significant progress has been made in improving the capability of subzero start-up of fuel cell passenger vehicles. For example, in 2008, a fuel cell passenger vehicle FCHV-adv of Toyota Motor Corporation successfully started at −37° C. in the wild (Kojima K, Morita T. Development of fuel cell hybrid vehicle in TOYOTA[J]. ECS Transactions, 2008, 16(2): 185-198). Although automobile companies have made breakthroughs in improving the capability of subzero start-up of fuel cell passenger vehicles, yet internationally, fuel cell commercial vehicles do not have a capability of subzero self-starting. In order to meet service life requirements of commercial vehicles, it is more suitable to use graphite-based bipolar plates with better durability, rather than metal-based bipolar plates widely used in passenger vehicles. Since processing performance of the graphite-based bipolar plates are not as good as that of the metal-based bipolar plates, the graphite-based bipolar plates are relatively thick, which will increase a heat capacity of a stack in multiples, thereby bringing greater challenges to quickly heating up the stack of the fuel cell and solving the problem of the subzero start-up.

In view of methods developed for the subzero start-up of the fuel cell, especially the problem of the subzero start-up for commercial vehicles, methods generally used for the subzero start-up include heat generation and heat preservation. The heat production may be divided into two methods, i.e., external heating and system self-heating. Methods of external heating are bipolar plate or end plate heating of the fuel cell, intake air heating and coolant heating. There are currently three methods reported using internal heating, which are catalytic combustion, hydrogen storage and heat release, and phase change materials.

The methods of external heating used are to heat up the stack to raise the temperature of the stack above zero. These methods consume a large amount of external energy and the device is complicated. A fuel cell bus equipped with a FCveloCity power module developed by a Canadian company Ballard Power Systems Inc. implements heating through an external heat preservation and an on-board battery to perform the subzero start-up. A patent (CN201720137213.8) uses a method of adding resistance wires to the bipolar plate to heat up the stack. Although this method has a good heating effect, an original structure of the fuel cell needs to be destroyed, and also, the cost is relatively high when it is used for stack applications of the fuel cell. A patent (CN201720047171.9) uses microwave heating to heat up the stack. This method avoids damages to the original structure of the battery, but it is necessary to increase a microwave generating device. In addition, the efficiency and location of microwave heating are difficult to be controlled.

Generally, the methods of system self-heating provide energy for the subzero start-up by a fuel or other materials carried by the system. These methods can reduce the consumption of external energy and generally do not need to destroy the original structure of the battery. A patent (CN201510600125.2) uses hydrogen combustion to heat up a coolant so as to heat up the stack. This method requires providing a hydrogen combustion device. Since the coolant needs to be heated up, time for the subzero start-up is generally relatively long. An invention patent (CN200610134075.4) introduces a method of heating up a battery using heat released from a cathode reaction. Key invention points of the patent are as follows. In an environment of −5° C. to −20° C., gas atmospheres of a cathode and an anode are hydrogen and oxygen (air) respectively. A heavy current is loaded by a direct current power supply to generate hydrogen at the cathode. The hydrogen generated and oxygen react and release heat under an action of a catalyst for cold start-up. Since there is basically no humidification in gas under the subzero start-up, membrane dryness is prone to occur under heavy current conditions. In addition, since water is produced when hydrogen and oxygen react at the cathode, the water produced may freeze. A volume expansion caused by freezing may damage the structure of the battery and cause aging of the battery.

In order to solve problems of the subzero start-up of the fuel cell such as aging resulted from freezing of the water produced, high energy consumption during start-up, and insufficient heat generation efficiency, it is urgent to develop a new method and apparatus.

SUMMARY

The present disclosure aims to solve at least one of the technical problems in the related art to a certain extent. An objective of the present disclosure is to provide a method and apparatus for subzero start-up of a fuel cell to overcome defects of water production and freezing due to self-generation of heat, high cost due to a complicated apparatus, and high energy consumption during a start-up process of the fuel cell. During the subzero start-up, the fuel cell is fed with gas containing hydrogen intermittently or continuously, and then, alternating current or alternating voltage control is applied to the fuel cell, thereby making full use of ohmic heat generation, concentration overpotential heat generation and reaction heat of the fuel cell to heat up the fuel cell to achieve a rapid increase in a temperature of the fuel cell. This method for subzero start-up is highly efficient, or may avoid problems caused by freezing of water.

To implement the above objectives, the present disclosure provides a method for subzero start-up of a fuel cell. The method includes the following steps:

1) introducing a gas containing hydrogen having a mass percentage of 5% to 100% to a hydrogen electrode and an air electrode of the fuel cell under a condition of minus 50° C. to 0° C.; in other words, providing a hydrogen-containing atmosphere: providing the hydrogen-containing atmosphere to the fuel cell at a temperature of minus 50° C. to 0° C., a hydrogen concentration being 5% to 100%; and 2) applying a current or a voltage to the fuel cell, and utilizing ohmic heat generation, reaction heat, and concentration overpotential heat generation of the fuel cell to raise the fuel cell to a required temperature or to cause the fuel cell to reach a set time, so as to implement the subzero start-up of the fuel cell; in other words, applying current or voltage control: under the hydrogen-containing atmosphere provided in step 1), applying the current or voltage control to the fuel cell, and utilizing the ohmic heat generation, the reaction heat, and the concentration overpotential heat generation of the fuel cell to raise the fuel cell to the required temperature or to cause the fuel cell to reach the set time to complete the subzero start-up of the fuel cell.

According to embodiments of the present disclosure, a manner of introducing the gas containing the hydrogen having the mass percentage of 5% to 100% to the hydrogen electrode and the air electrode of the fuel cell is a continuous or intermittent introduction; in other words, the manner of providing the hydrogen-containing atmosphere to the fuel cell is continuous or intermittent provision, and the intermittent provision may save hydrogen consumption.

According to embodiments of the present disclosure, the current or the voltage is a direct current or an alternating current. In some embodiments of the present disclosure, the current or the voltage is an alternating current or an alternating voltage. In other words, the current or voltage applied in step 2) is the direct current or alternating current, and in some embodiments of the present disclosure, is the alternating current or alternating voltage. Consequently, the efficiency is high, and the problems caused by the freezing of water are further avoided.

According to embodiments of the present disclosure, the alternating current or the alternating voltage is selected from an alternating current and an alternating voltage of a symmetrical waveform or an alternating current and an alternating voltage of an asymmetrical waveform. In other words, the alternating current or voltage is selected from the alternating current or voltage of the symmetrical waveform or the alternating current or voltage of the asymmetrical waveform. Consequently, the efficiency is high, and an occurrence of membrane dryness during the subzero start-up is further avoided.

According to embodiments of the present disclosure, an absolute value of a magnitude of the alternating voltage is 0.1 V to 4 V. In other words, the absolute value of the magnitude of the alternating voltage averages between 0.1 V to 4V per sheet. In consideration of reducing the aging caused by operation at high potential, the absolute value of the magnitude of the voltage is preferably less than 1.4 V per sheet.

According to embodiments of the present disclosure, an absolute value of a magnitude of the alternating current is determined based on an internal resistance and a load range of the fuel cell, and an absolute value of a current density is in a range from 0.2 A/cm$^2$ to 6 A/cm$^2$. In other words, the current density is in a range from 0.2 A/cm$^2$ to 6 A/cm$^2$.

According to embodiments of the present disclosure, a frequency of the alternating current or the alternating voltage is in a range from 0.01 Hz to 100 Hz. In other words, a range of the frequency of the alternating current or the alternating voltage is in a range from 0.01 Hz to 100 Hz.

According to embodiments of the present disclosure, a waveform of the alternating current or the alternating voltage adopts any one or more of a square wave, a sine wave, a triangular wave or a step wave.

According to embodiments of the present disclosure, during a start-up process, the magnitude and a frequency of the alternating voltage are adjusted based on the following manner: without exceeding a maximum current range of a power supply, the fuel cell, and accessories thereof, if an internal resistance of the fuel cell reduces, reducing the absolute value of the magnitude of the alternating voltage and increasing the frequency, and if the internal resistance of the fuel cell increases, increasing the absolute value of the magnitude of the alternating voltage and reducing the frequency, so as to increase a heat production rate.

According to embodiments of the present disclosure, during a start-up process, the magnitude and a frequency of the alternating current are adjusted based on the following manner: without exceeding a maximum current range of a power supply, the fuel cell, and accessories thereof, if the internal resistance of the fuel cell reduces, reducing the absolute value of the magnitude of the alternating current and increasing the frequency, and if the internal resistance of the fuel cell increases, increasing the absolute value of the magnitude of the alternating current and reducing the frequency, so as to increase the heat production rate.

According to embodiments of the present disclosure, the method further includes that, before the fuel cell enters a subzero environment, the internal resistance of the fuel cell is controlled to be in a range from 0.2 Ω·cm$^2$ to 8 Ω·cm$^2$ by purging the fuel cell with gas. In other words, before the fuel cell enters the subzero environment, an average internal resistance of the fuel cell is controlled to be in a range from 0.2 Ω·cm$^2$ to 8 Ω·cm$^2$ per sheet by purging the fuel cell with gas. Consequently, the ohmic heat generation of the battery may be fully utilized.

According to embodiments of the present disclosure, the method further includes that, after the subzero start-up is completed, a concentration of hydrogen in the air electrode is reduced by gas purging or by controlling the current or voltage of the fuel cell. Consequently, it is possible to reduce an occurrence of carbon corrosion caused by a formation of a hydrogen void interface resulted from a contact with oxygen.

According to embodiments of the present disclosure, the fuel cell is a proton exchange membrane fuel cell or a phosphoric acid fuel cell. Consequently, the application range is wild.

The present disclosure also provides an apparatus for subzero start-up based on the above method, including the fuel cell, a hydrogen supply device, and a current generation device, wherein an air outlet of the hydrogen supply device is simultaneously connected to the hydrogen electrode and the air electrode of the fuel cell, or the air outlet of the hydrogen supply device is connected to any one of the hydrogen electrode and the air electrode of the fuel cell, and the hydrogen electrode and the air electrode of the fuel cell are connected by a pipe, so as to introduce the gas containing the hydrogen having the mass percentage of 5% to 100% to the air electrode and the hydrogen electrode of the fuel cell; and a positive electrode and a negative electrode of the current generation device are respectively connected to the hydrogen electrode and the air electrode of the fuel cell, so as to apply current or voltage control to the fuel cell; in other words, including the fuel cell, the hydrogen supply device, and the current generation device, wherein the air outlet of the hydrogen supply device is simultaneously connected to the hydrogen electrode and the air electrode of the fuel cell, or the air outlet of the hydrogen supply device is connected to any one of the hydrogen electrode and the air electrode of the fuel cell, and the hydrogen electrode and the air electrode of the fuel cell are connected by the pipe, so as to provide the hydrogen-containing atmosphere for the fuel cell; and the positive electrode and the negative electrode of the current generation device are respectively connected to the hydrogen electrode and the air electrode of the fuel cell, so as to apply the current or voltage control to the fuel cell.

According to embodiments of the present disclosure, a hydrogen source of the hydrogen supply device is a hydrogen cylinder, a metal hydrogen storage device, or an electrolytic hydrogen production device.

According to embodiments of the present disclosure, the current generation device may achieve the current control of the fuel cell, and a manner of control may adopt voltage control, current control or power control.

According to embodiments of the present disclosure, a device for estimating a magnitude of the current and voltage applied may be added. An alternating-current impedance measuring device is connected between the hydrogen electrode and the air electrode of the fuel cell, so as to measure the internal resistance of the fuel cell.

According to embodiments of the present disclosure, a temperature monitoring device is provided inside the fuel cell, so as to monitor a temperature of a membrane electrode assembly or a bipolar plate of the fuel cell; or an open-circuit voltage monitoring device is connected between the hydrogen electrode and the air electrode of the fuel cell, so as to monitor an open circuit voltage of the fuel cell; and then, to determine a subzero start-up process of the fuel cell.

Features and beneficial effects of the present disclosure will be described as follows.

1) The method for the subzero start-up provided by the present disclosure has a wide applicable temperature range, and may successfully achieve the subzero start-up at a temperature of −50° C.-0° C.

2) The method for the subzero start-up provided by the present disclosure uses the battery to generate heat by itself, does not require additional devices, and has high heat generation efficiency. Gas atmospheres of both a cathode and an anode (i.e., the hydrogen electrode and the air electrode) used in the method of the present disclosure are hydrogen-containing atmospheres. Both alternating-current and direct-current power supplies may be loaded. Heat generation comes from the ohmic heat generation, the reaction heat, and the concentration overpotential heat generation of the current.

3) The reaction that occurs during the subzero start-up is a generation and consumption of hydrogen and no water is produced, such that the problem of aging caused by the formation of the freezing of water is avoided.

4) The present disclosure may utilize components of an original power device of the fuel cell, has low cost, and is expected to be commercialized on a large scale. In particular, the manner that produces no water and raises the temperature rapidly solves a current problem that fuel cells of commercial vehicles cannot be started below zero.

DESCRIPTION OF EMBODIMENTS

Embodiments of the present disclosure will be described in detail below. Embodiments described with reference to the accompanying drawings are intended to explain the present disclosure, and should not be understood as limiting the present disclosure.

The present disclosure provides a method and apparatus for subzero start-up of a fuel cell. The specific process of the method for the subzero start-up according to embodiments of the present disclosure will be described below with reference to the accompanying drawings. The present disclosure takes a proton exchange membrane fuel cell as an example, but the method, instead of being limited to the proton exchange membrane fuel cell, may also be used for various types of proton exchange fuel cells such as phosphoric acid fuel cells.

Embodiment 1

An embodiment of the present disclosure is a subzero start-up process of a proton exchange membrane cell for a vehicle. A method for subzero start-up of a fuel cell includes the following steps:

1) A hydrogen-containing atmosphere is provided: at −30° C., high-purity hydrogen (with a concentration close to 100%) is introduced to two sides of the fuel cell for about 5 minutes, with a flow rate of 0.05 L/min.

2) An alternating voltage control is applied: in the hydrogen-containing atmosphere provided in step 1), an alternating voltage square wave signal is applied to the fuel cell (in addition, a selection may also be made from other waveforms that may make full use of energy, such as one or more of a sine wave, a triangle wave, or a step wave). An absolute value of a magnitude of a voltage is 1.0 V, and a frequency is 2.5 Hz. A use of an alternating voltage (or an alternating current) may avoid membrane dryness. While the alternating voltage is applied, in order to improve efficiency of heat production and save consumption of hydrogen, a manner of intermittently introducing hydrogen into the fuel cell is adopted. Reaction heat and concentration overpotential heat generation of the fuel cell are used to raise the fuel cell to 0° C. to complete the subzero start-up of the fuel cell.

Figure 1:
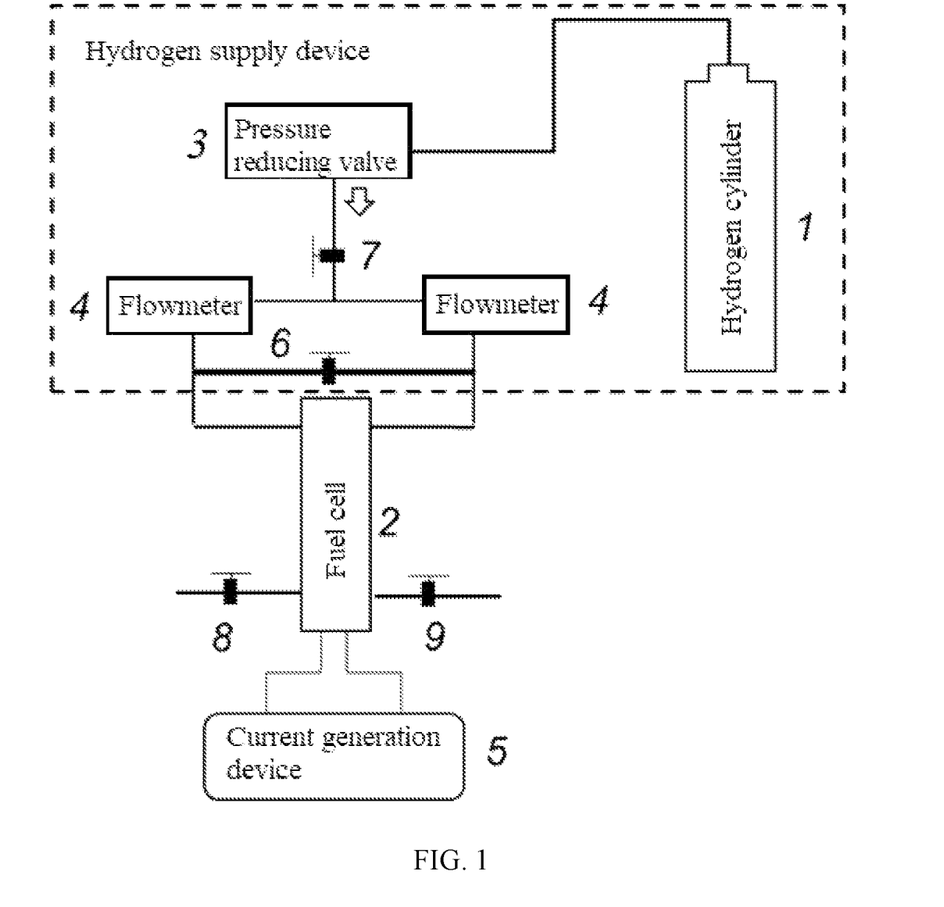
FIG. 1 is a schematic diagram showing an apparatus according to an embodiment of the present disclosure.

The above method is achieved by an apparatus for subzero start-up of a fuel cell illustrated in FIG. 1. The apparatus for the subzero start-up includes a fuel cell 2, a hydrogen supply device and a current generation device 5. A hydrogen source of the hydrogen supply device is a hydrogen cylinder 1 (in addition, a metal hydrogen storage device or an electrolytic hydrogen production device may also achieve the same effect). A gas outlet of the hydrogen cylinder 1 forms two branches through a pipe provided with a pressure reducing valve 3 and a valve 7 in sequence. The two branches are each provided with a flowmeter 4, and are connected to the hydrogen electrode and the air electrode of the fuel cell 2 respectively. Also, the hydrogen electrode and the air electrode of the fuel cell 2 are connected through a pipe provided with a valve 6 between the two branches to provide the fuel cell 2 with the hydrogen-containing atmosphere (which may be pure hydrogen or a gas mixture containing hydrogen). The hydrogen cylinder 1, the pressure reducing valve 3, the two flowmeters 4, the valves 6 and 7 together form the hydrogen supply device. The hydrogen electrode and the air electrode of the fuel cell 2 according to this embodiment are respectively connected to an external exhaust treatment device through a pipe with valves (8, 9) for discharging hydrogen. When hydrogen is introduced, the valve 7 is opened and the valve 6 is closed (that is, the hydrogen-containing atmosphere is directly provided to the hydrogen electrode and air electrode of the fuel cell through the pipes). Then, about 2 minutes after the hydrogen electrode and the air electrode of the fuel cell 2 are fed with hydrogen, the hydrogen electrode and the air electrode of the fuel cell 2 are both in the hydrogen-containing atmosphere. A positive electrode and a negative electrode of the current generation device 5 (for example, VMP 2000 produced by Biologic) are respectively connected to the hydrogen electrode and the air electrode of the fuel cell 2 for applying current or voltage control to the fuel cell.

Further, an alternating-current impedance measuring device (this embodiment uses VMP 2000 produced by Biologic) is also connected between the hydrogen electrode and the air electrode of the fuel cell 2 to measure an internal resistance of the fuel cell. By monitoring the internal resistance of the fuel cell, the alternating voltage or current may be set, and magnitude and frequency of the alternating voltage may be flexibly adjusted during a start-up process, so as to fully increase a heat production effect.

Further, a temperature monitoring device is provided inside the fuel cell 2, so as to monitor a temperature of a membrane electrode assembly or a bipolar plate of the fuel cell; or an open-circuit voltage monitoring device is connected between the hydrogen electrode and the air electrode of the fuel cell, so as to monitor an open circuit voltage of the fuel cell. In this embodiment, a miniature thermocouple is placed on a sealing gasket between an air-side membrane electrode and the bipolar plate of the fuel cell. When the temperature rises above zero, an application of the alternating voltage or current is stopped.

Figure 2:
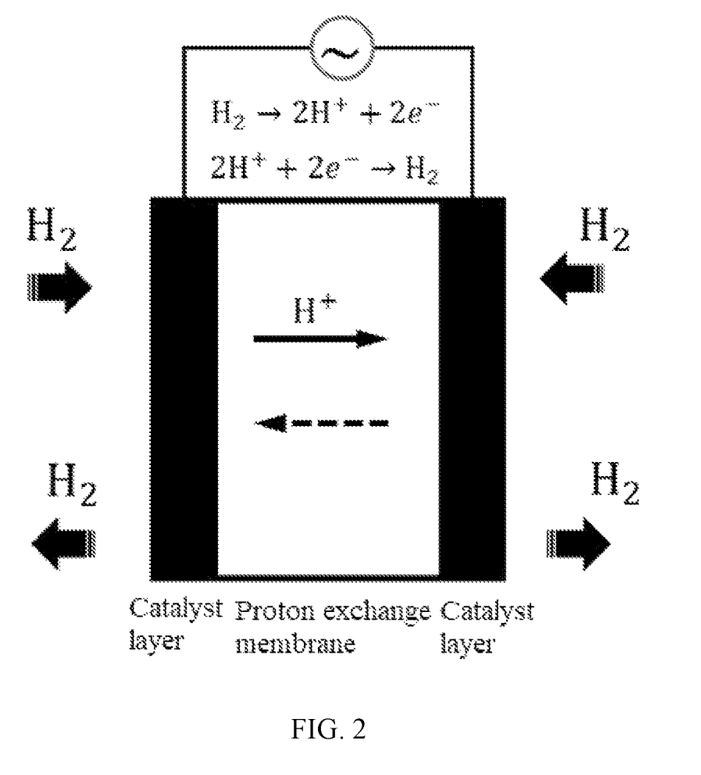
FIG. 2 is a schematic diagram showing a heat generation principle of subzero start-up according to an embodiment of the present disclosure.

A schematic diagram of a heat generation process according to this embodiment is illustrated in FIG. 2. By applying the alternating voltage or current, hydrogen is consumed in a catalyst layer on one side, and hydrogen is generated in a catalyst layer on the other side. A whole reaction process does not produce water, and the ohmic heat generation, the reaction heat and the concentration overpotential heat generation are used to heat up the battery.

Figure 3:
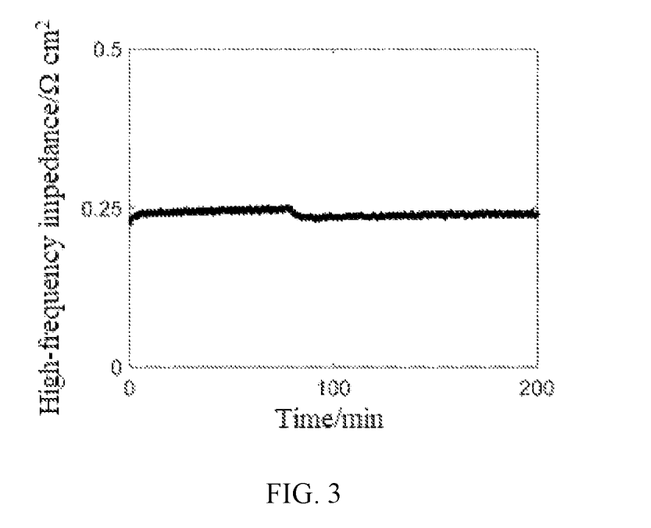
FIG. 3 is a schematic diagram showing a change of high-frequency impedance during wet purging according to an embodiment of the present disclosure.

Further, this embodiment also includes providing a subzero start-up environment before a start of the subzero start-up process. A specific process is as follows. First, the internal resistance of the fuel cell is adjusted by gas purging (this step may keep the internal resistance of the fuel cell within a certain range, which is beneficial to a determination of a magnitude of the alternating voltage or current applied). A temperature of a fuel cell with an active area of 4 cm$^2$ is raised to 80° C. Nitrogen with a relative humidity of 66% is used for wet purging. The internal resistance of the fuel cell is adjusted to about 0.25 Ω·cm$^2$. A change in the internal resistance (expressed in high-frequency impedance, and the high-frequency impedance is impedance at a measurement frequency of 1,000 Hz) of the fuel cell during a purging process is illustrated in FIG. 3. The fuel cell is placed in a thermostat to reduce a temperature of the fuel cell to −30° C. Then, the start-up process as described in the above steps is performed.

Further, after the subzero start-up process is over, this embodiment also includes a process of gas purging to reduce a hydrogen concentration of the air electrode (it is to be noted that the gas purging here refers to that gas in the air electrode is diluted by the gas purging, thereby reducing a concentration of hydrogen in the air electrode). High-purity nitrogen with a flow rate of 0.1 L/min is used for a continuous purging of 20 minutes.

Figure 4:
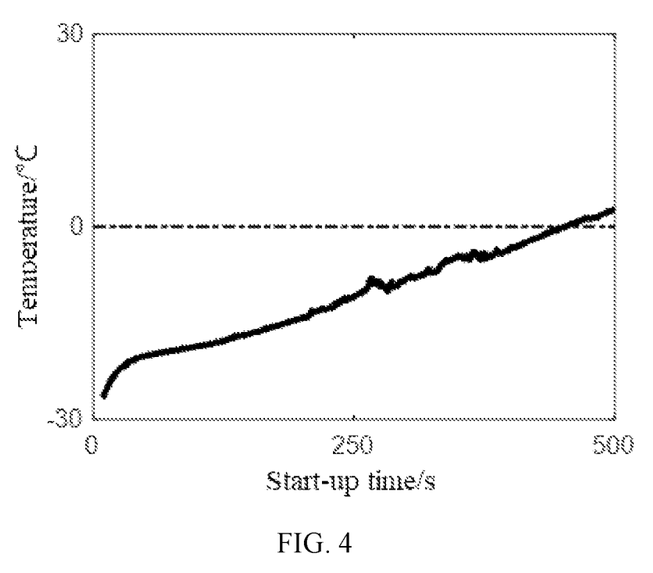
FIG. 4 is a schematic diagram showing a heat generation effect of a hydrogen pump according to Embodiment 1 of the present disclosure.

A temperature rising process of the fuel cell in this embodiment is recorded. It takes about 420 s to rise from minus 30° C. to 0° C. An entire process of cold start-up is illustrated in FIG. 4. A black solid line represents a temperature of the sealing gasket between the air-side membrane electrode and the bipolar plate of the fuel cell, which successfully reaches 0° C.

Embodiment 2

An embodiment of the present disclosure is the subzero start-up process for the proton exchange membrane cell for the vehicle. Differences between Embodiment 2 and Embodiment 1 are as follows.

Before step 1), the subzero start-up environment provided includes: raising the temperature of the fuel cell with the active area of 4 cm$^2$ to 80° C., using nitrogen with a relative humidity of 58% for wet purging, and adjusting the internal resistance of the fuel cell to about 0.35 Ω·cm$^2$.

In step 2), the absolute value of the magnitude of the voltage of the alternating voltage square wave signal applied to the fuel cell is 1.4 V and the frequency is 0.1 Hz.

The rest are the same as Embodiment 1, and will not be repeated here.

Figure 5:
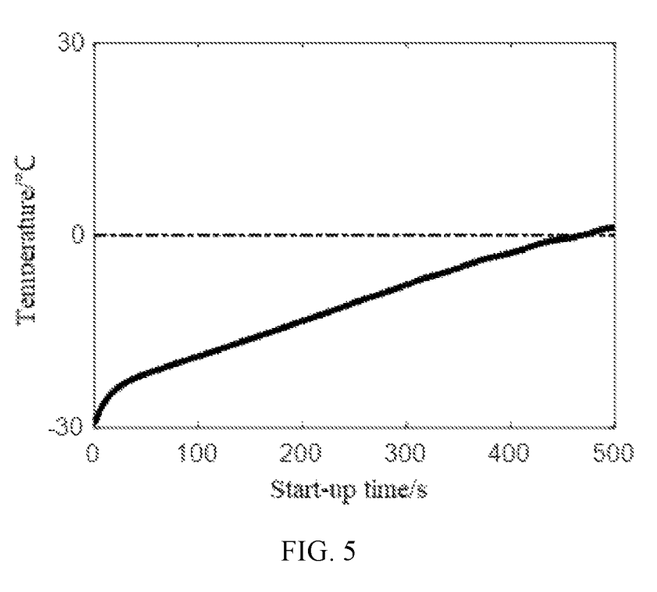
FIG. 5 is a schematic diagram showing a heat generation effect of a hydrogen pump according to Embodiment 2 of the present disclosure.

A temperature rising process of the fuel cell in this embodiment is recorded. It takes about 460 s to rise from minus 30° C. to 0° C. An entire process of cold start-up is illustrated in FIG. 5. A black solid line represents a temperature of the sealing gasket between the air-side membrane electrode and the bipolar plate of the fuel cell, which successfully reaches 0° C.

Embodiment 3

An embodiment of the present disclosure is a subzero start-up process of a proton exchange membrane cell for a vehicle. A method for subzero start-up of a fuel cell includes the following steps:

1) A hydrogen-containing atmosphere is provided: at −30° C., high-purity hydrogen (with a concentration close to 100%) is introduced to two sides of the fuel cell for about 5 minutes, with a flow rate of 0.05 L/min.

2) An alternating voltage control is applied: in the hydrogen-containing atmosphere provided in step 1), a direct current voltage is applied to the fuel cell, and an absolute value of a magnitude of the voltage is 1.0 V (compared with an alternating voltage, applying the direct current voltage may also achieve a purpose of the present disclosure, but time required is slightly longer). While the direct current voltage is applied, in order to improve efficiency of heat production and save consumption of hydrogen, a manner of introducing hydrogen to a side of the fuel cell is adopted. Also, a pipe is used to connect the hydrogen electrode and the air electrode of the fuel cell to form a closed loop of hydrogen. The reaction heat and the concentration overpotential heat generation of the fuel cell are used to raise the fuel cell to 0° C. to complete the subzero start-up of the fuel cell.

This embodiment implements the above method through the apparatus for the subzero start-up of the fuel cell illustrated in FIG. 1. The apparatus for the subzero start-up includes the fuel cell 2, the hydrogen supply device and the current generation device 5. The hydrogen source of the hydrogen supply device is the hydrogen cylinder 1 (in addition, the metal hydrogen storage device or the electrolytic hydrogen production device may also achieve the same effect). The gas outlet of the hydrogen cylinder 1 forms the two branches through the pipe provided with the pressure reducing valve 3 and the valve 7 in sequence. The two branches are each provided with the flowmeter 4, and are connected to the hydrogen electrode and the air electrode of the fuel cell 2 respectively. Also, the hydrogen electrode and the air electrode of the fuel cell 2 are connected through the pipe provided with the valve 6 between the two branches to provide the fuel cell 2 with the hydrogen-containing atmosphere (which may be pure hydrogen or a gas mixture containing hydrogen). The hydrogen electrode and the air electrode of the fuel cell 2 according to this embodiment are respectively connected to the external exhaust treatment device through the pipe with the valves (8, 9) for discharging hydrogen. When hydrogen is introduced, the valve 7 is opened and the valve 6 is closed. Then, about 2 minutes after the hydrogen electrode and the air electrode of the fuel cell 2 are fed with hydrogen, the hydrogen electrode and the air electrode of the fuel cell 2 are both in the hydrogen-containing atmosphere. Next, the valves 7, 8, 9 are closed, and the valve 6 is opened. The positive electrode and the negative electrode of the current generation device 5 (for example, VMP 2000 produced by Biologic) are respectively connected to the hydrogen electrode and the air electrode of the fuel cell 2 for applying the current or voltage control to the fuel cell.

Further, the alternating-current impedance measuring device is also connected between the hydrogen electrode and the air electrode of the fuel cell 2 to measure the internal resistance of the fuel cell. By monitoring the internal resistance of the fuel cell, the direct current voltage or current may be set, and a magnitude of the direct current voltage may be flexibly adjusted during a start-up process, so as to fully increase a heat production effect. (This embodiment uses VMP 2000 produced by Biologic).

Further, the temperature monitoring device is provided inside the fuel cell 2, so as to monitor the temperature of the membrane electrode assembly or the bipolar plate of the fuel cell; or the open-circuit voltage monitoring device is connected between the hydrogen electrode and the air electrode of the fuel cell, so as to monitor the open circuit voltage of the fuel cell. In this embodiment, the miniature thermocouple is placed on the sealing gasket between the air-side membrane electrode and the bipolar plate of the fuel cell. When the temperature rises above zero, an application of a voltage or current is stopped.

A principle of this embodiment is the same as that of Embodiment 1.

Further, this embodiment also includes providing the subzero start-up environment before a start of the subzero start-up process. A specific process is as follows. First, the internal resistance of the fuel cell is adjusted by gas purging. This step may keep the internal resistance of the fuel cell within a certain range, which is beneficial to a determination of a magnitude of the alternating voltage or current applied. The temperature of the fuel cell with the active area of 4 cm$^2$ is raised to 80° C. Nitrogen with a relative humidity of 58% is used for wet purging. The internal resistance of the fuel cell is adjusted to about 0.35 Ω·cm$^2$. The fuel cell is placed in a thermostat to reduce the temperature of the fuel cell to −30° C. Then, the start-up process as described in the above steps is performed.

Further, after the subzero start-up process is over, this embodiment also includes a process of gas purging to reduce a hydrogen concentration of the air electrode. High-purity nitrogen with a flow rate of 0.1 L/min is used for a continuous purging of 20 minutes.

A temperature rising process of the fuel cell in this embodiment is recorded. It takes about 1,350 s to rise from minus 30° C. to 0° C.

Embodiment 4

An embodiment of the present disclosure is the subzero start-up process for the proton exchange membrane cell for the vehicle. Differences between Embodiment 2 and Embodiment 1 are as follows.

In step 1), a hydrogen-containing atmosphere provided is that: at −30° C., hydrogen with a concentration of 5% is introduced to two sides of the fuel cell for about 5 minutes at a flow rate of 0.05 L/min.

In step 2), an absolute value of a magnitude of a voltage of an alternating voltage square wave signal applied to the fuel cell is 1.0V, and a frequency is 100 Hz.

The rest are the same as Embodiment 1, and will not be repeated here.

A temperature rising process of the fuel cell in this embodiment is recorded. It takes about 430 s to rise from minus 30° C. to 0° C.

Embodiment 5

An embodiment of the present disclosure is the subzero start-up process for the proton exchange membrane cell for the vehicle. Differences between Embodiment 2 and Embodiment 1 are as follows.

In step 2), an absolute value of a magnitude of a voltage of an alternating voltage square wave signal applied to the fuel cell is 1.0 V, and a frequency is 0.01 Hz. The rest are the same as Embodiment 1, and will not be repeated here.

A temperature rising process of the fuel cell in this embodiment is recorded. It takes about 690 s to rise from minus 30° C. to 0° C.

Embodiment 6

An embodiment of the present disclosure is the subzero start-up process for the proton exchange membrane cell for the vehicle. Differences between Embodiment 2 and Embodiment 1 are as follows.

In step 1), a starting temperature for subzero start-up is −50° C.

In step 2), an absolute value of a magnitude of a voltage of an alternating voltage square wave signal applied to the fuel cell is 1.0 V, and a frequency is 2.5 Hz.

The rest are the same as Embodiment 1, and will not be repeated here.

A temperature rising process of the fuel cell in this embodiment is recorded. It takes about 3,170 s to rise from minus 50° C. to 0° C.

In summary, the method and apparatus of the present disclosure may effectively solve current problems such as high energy consumption for subzero start-up of a fuel cell, degraded performance and shortened service life of a battery due to a formation of water and freezing of the water.

What is claimed is:

1. A method for subzero start-up of a fuel cell, comprising:
introducing a gas containing 5 to 100 mass percent of hydrogen to a hydrogen electrode and an air electrode of the fuel cell under a condition of minus 50° C. to 0° C.; and
applying a current or a voltage to the fuel cell, and utilizing ohmic heat generation, reaction heat, and concentration overpotential heat generation of the fuel cell to raise the fuel cell to a required temperature or to heat the fuel cell for a set period of time, so as to implement the subzero start-up of the fuel cell.

2. The method of claim 1, wherein a manner of introducing the gas containing 5 to 100 mass percent of hydrogen to the hydrogen electrode and the air electrode is a continuous or intermittent introduction.

3. The method of claim 1, wherein the current is a direct current or an alternating current, or the voltage is a direct voltage or an alternating voltage.

4. The method of claim 3, wherein the current is an alternating current, or the voltage is an alternating voltage.

5. The method of claim 4, wherein the alternating current is an alternating current of a symmetrical waveform or an asymmetrical waveform; or
the alternating voltage is an alternating voltage of a symmetrical waveform or an asymmetrical waveform.

6. The method of claim 5, wherein an absolute value of a magnitude of the alternating voltage is in a range from 0.1 V to 4 V.

7. The method of claim 5, wherein an absolute value of a magnitude of the alternating current is determined based on an internal resistance and a load range of the fuel cell, and an absolute value of a current density is in a range from 0.2 A/cm$^2$ to 6 A/cm$^2$.

8. The method of claim 5, wherein a frequency of the alternating current or the alternating voltage is in a range from 0.01 Hz to 100 Hz.

9. The method of claim 5, wherein a waveform of the alternating current or the alternating voltage adopts any one or more of a square wave, a sine wave, a triangular wave or a step wave.

10. The method of claim 6, wherein during a start-up process, the magnitude and a frequency of the alternating voltage are adjusted based on the following manner: without exceeding a maximum current range of a power supply, the fuel cell, and accessories thereof, if an internal resistance of the fuel cell reduces, reducing the absolute value of the magnitude of the alternating voltage and increasing the frequency of the alternating voltage, and if the internal resistance of the fuel cell increases, increasing the absolute value of the magnitude of the alternating voltage and reducing the frequency of the alternating voltage.

11. The method of claim 7, wherein during a start-up process, the magnitude and a frequency of the alternating current are adjusted based on the following manner: without exceeding a maximum current range of a power supply, the fuel cell, and accessories thereof, if the internal resistance of the fuel cell reduces, reducing the absolute value of the magnitude of the alternating current and increasing the frequency of the alternating current, and if the internal resistance of the fuel cell increases, increasing the absolute value of the magnitude of the alternating current and reducing the frequency of the alternating current.

12. The method of claim 1, wherein before the fuel cell enters a subzero environment, an internal resistance of the fuel cell is controlled to be in a range from 0.2 Ω·cm$^2$ to 8 Ω·cm$^2$ by purging the fuel cell with gas.

13. The method of claim 1, wherein after the subzero start-up is completed, a concentration of hydrogen in the air electrode of the fuel cell is reduced by gas purging or by controlling a current or voltage of the fuel cell.

14. The method of claim 1, wherein the fuel cell is a proton exchange membrane fuel cell or a phosphoric acid fuel cell.

15. An apparatus which performs the method for subzero start-up of a fuel cell of claim 1, comprising the fuel cell, a hydrogen supply device, and a current generation device, wherein an outlet of the hydrogen supply device is simultaneously connected to the hydrogen electrode and the air electrode of the fuel cell, or the outlet of the hydrogen supply device is connected to any one of the hydrogen electrode and the air electrode of the fuel cell, and the hydrogen electrode and the air electrode of the fuel cell are connected by a pipe, so as to introduce the gas containing 5 to 100 mass percent of hydrogen to the air electrode and the hydrogen electrode of the fuel cell; and a positive electrode and a negative electrode of the current generation device are respectively connected to the hydrogen electrode and the air electrode of the fuel cell, so as to apply the current or the voltage to the fuel cell.

16. The apparatus of claim 15, wherein a hydrogen source of the hydrogen supply device is a hydrogen cylinder, a metal hydrogen storage device, or an electrolytic hydrogen production device.

17. The apparatus of claim 15, wherein an alternating-current impedance measuring device is connected between the hydrogen electrode and the air electrode of the fuel cell, so as to measure an internal resistance of the fuel cell.

18. The apparatus of claim 15, wherein a temperature monitoring device is provided inside the fuel cell, so as to monitor a temperature of a membrane electrode assembly or a bipolar plate of the fuel cell; or an open-circuit voltage monitoring device is connected between the hydrogen electrode and the air electrode of the fuel cell, so as to monitor an open circuit voltage of the fuel cell; and then, the monitored temperature of the membrane electrode assembly or the bipolar plate of the fuel cell or the monitored open circuit voltage of the fuel cell is used as an indicator for initiating a subzero start-up process of the fuel cell.

* * * * *